July 19, 1949.　　　　L. L. BOUCHARD　　　　2,476,532
HORSESHOE PITCHING COURT

Filed May 13, 1946

INVENTOR,
Leonard L. Bouchard
BY Charles Shepard
Attorney

Patented July 19, 1949

2,476,532

UNITED STATES PATENT OFFICE 2,476,532

HORSESHOE PITCHING COURT

Leonard L. Bouchard, Rochester, N. Y.

Application May 13, 1946, Serial No. 669,253

4 Claims. (Cl. 273—104)

This invention relates to a horseshoe pitching court. An object of the invention is the provision of an improved and more satisfactory court, and particularly one which can be set up in any desired place, either outdoors or indoors, which can be moved easily from place to place, and which will not injure the floor on which it is set indoors or the grass or other area on which it is set outdoors.

Another object is the provision of a horseshoe court of simple, sturdy, and inexpensive construction.

These and other desirable objects are accomplished by the construction disclosed as an illustrative embodiment of the invention in the following description and in the accompanying drawings forming a part hereof, in which.

The same reference numerals throughout the several views indicate the same parts.

The game or sport of pitching horseshoes is quite popular and is healthful and invigorating, as well as providing sport and amusement. Many persons who would otherwise install a horseshoe pitching court on the grounds of their homes and thus enjoy the benefits of the game, are deterred from installing a court, however, by the fact that a horseshoe pitching court of the usual kind soon produces an unsightly area around the stake, the repeated falling of the horseshoes digging a hole of substantial depth in the vicinity of the stake and killing the grass roots.

To overcome these drawbacks and to enable a horseshoe court to be provided without damage to the lawn or turf, or even indoors in a basement room or the like, the present invention provides a light, portable, and compact court which can be placed anywhere without damage to the grass or floor.

The horseshoe pitching court in its preferred form comprises four major elements or parts: first, the stake; second, a pan of suitable dimensions surrounding the stake; third, a filling of clay or the like in the pan; and fourth, an apron or guard formed preferably of wooden slats, surrounding three sides of the pan and of sufficient dimensions so that practically all of the pitched horseshoes will fall either on the apron or on the pan and will not come in contact with the grass or floor on which the court is placed.

Figure 1:
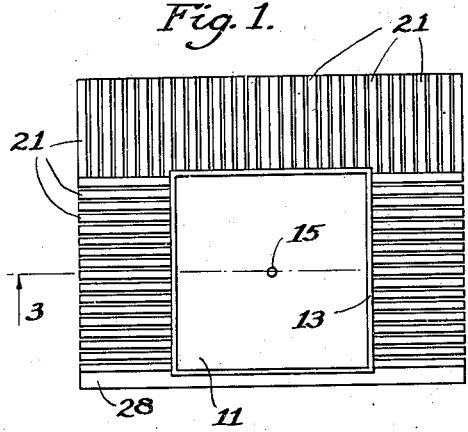
Fig. 1 is a plan of a horseshoe pitching court in accordance with one embodiment of the invention.

The pan and the apron may be of different sizes and shapes, depending on whether the construction is to be used for official tournament play, or merely for amateur entertainment. If used for tournament play, the dimensions will, of course, comply with any official rules and regulations. For example, in the tournament court illustrated in Figs. 1, 3, and 4 of the accompanying drawings, there is provided a pan 11 of heavy galvaized iron or the like, having a size of about 3 feet square, and including sides rising to about 5 inches and terminating in outwardly bent horizontal flanges 13 along all sides, as shown. The bottom of the pan is provided with a small hole in its center, through which a stake 15 of the proper official size is driven down into the ground, if the court is placed outdoors, the stake being held by a suitable bracket if the court is erected indoors. A filling of earth, such as clay, 17 is placed in the pan with its top surface substantially flush with the top edges of the sides of the pan.

Around three sides of the pan is the apron formed of wooden slats 21 held by screws or other suitable fastening means on the beams or supports 23 which constitute the framework. The supports 23 may be, for example, pieces of wood of the size commonly known as 2 x 4's the cross sectional dimensions being slightly less than 2 inches by 4 inches. The slats themselves may conveniently be of pieces of wood about 1 inch thick and 1½ inches wide and 18 inches long, adjacent slats being spaced from each other by an open space of about ½ inch. The foregoing dimensions are given only as an illustrative example and are not intended in a limiting sense. With the foregoing dimensions, it is seen that the apron extends about 18 inches laterally from the sides of the pan encompassed by the apron, these being the two lateral sides and the rear side of the pan, no apron being necessary or desirable on the front side of the pan facing toward the position where the player stands when pitching horseshoes. However, a beam 28 extends across the front of the pan and apron, to form a support for the lateral flange 13 at the front of the pan and to protect the front side wall of the pan from damage.

Figure 4:
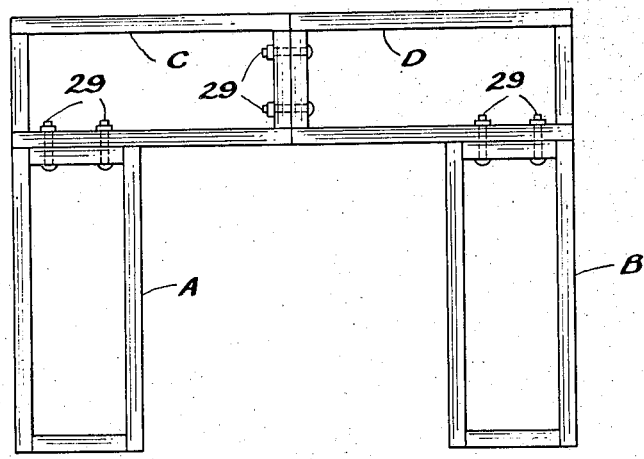
Fig. 4 is a plan of the framework of the court, with the slats removed.

For ease of portability, the framework of the apron is preferably divided into a plurality of sections detachably connected to each other. For example, as indicated in Fig. 4, the part of the apron on the left side of the pan has its own framework of 2 x 4's indicated in general by the reference character A; the part on the right of the pan has its framework indicated in general by the reference character B; and the part of the apron behind the pan and behind the two sections A and B is composed of two separate framework sections C and D, respectively. The section A is detachably secured to the section C by the bolts 29, the sections C and D are secured to each other likewise by bolts 29 and the sections D and B are similarly secured to each other by bolts.

Figure 3:
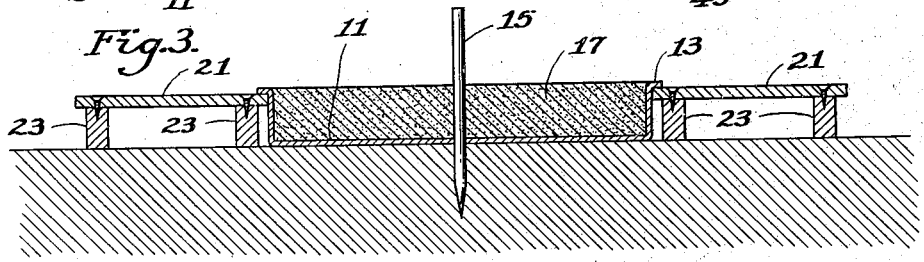
Fig. 3 is a vertical cross section taken substantially on the line 3—3 of Fig. 1.

It is seen from Fig. 3 that the height of the apron bears such relation to the height of the side walls of the pan that the marginal flange 13 on the side walls of the pan snugly overlies the inner edges of the apron and makes a tight fit therewith. In Fig. 3 the thickness of the metal of the pan is exaggerated for the sake of clarity, and in actual practice the thickness of the metal is much thinner and the flanges 13 thereof do not make any appreciable ridge on the apron.

In use, the various parts of the court are brought to the desired location in separate pieces, and the sections of the apron are then bolted to each other. It will be understood that the slats are permanently secured to the frame sections A, B, C, and D (although omitted from Fig. 4 for the sake of clearness) and so, during bolting or unbolting operations, the apron is turned upside down in order that the bolts may be more accessible when the four sections have been securely bolted to each other. The apron is then turned rightside up and placed in proper location on the lawn. Then the metal pan is laid in the space within the apron, with the marginal flanges on the pan coming down on top of the inner edges of the apron as shown. Then the stake 15 is driven through the hole in the bottom of the pan. Then the filling 17 of clay or the like, brought to the site in buckets or bags, is dumped into the pan and leveled off and packed down. The court is now ready for play.

Even if the court remains in a given position for several weeks at a time, no substantial injury to the lawn results. The spaces between the slats 21 of the apron allow access of sufficient air, light, and moisture to keep the grass under the apron in healthy condition. The grass which is directly under the pan 11 itself and under the framework beams 23 of the apron will gradually turn yellow, but will not die, and will quickly come back to its green color and healthy condition when the court is moved to a new location.

Figure 2:
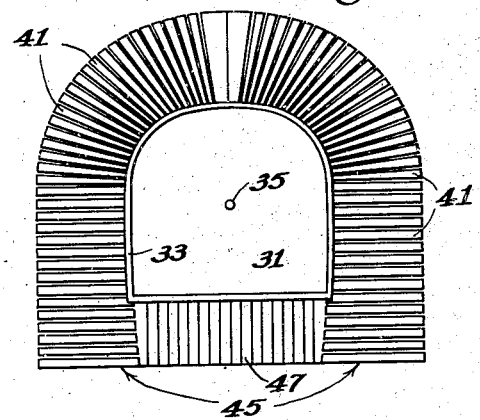
Fig. 2 is a plan of a slightly different form of court.

Referring now to Fig. 2 there is shown a similar court embodying the same principles of the invention but of slightly different shape which is thought to be of greater attractiveness and more pleasing appearance for ordinary home use, when not employed for official tournament play. The pan is here indicated at 31 and instead of being square, has rounded rear corners as seen, and a flange 33 at the top of the side walls to overlap the inner edges of the apron slats. The stake is indicated at 35. The apron slats 41 are secured as before to a framework which is in sections bolted together, the rear portion of the apron being curved to conform with the curvature of the pan. The sides of the apron are preferably brought forward a little in advance of the pan as indicated at 45. The apron as a whole, when viewed from above, gives the visual impression of a horseshoe, thus making it of more pleasing and attractive appearance and increasing its esthetic appeal to amateur devotees of the sport. A supplementary apron indicated in general at 47 is preferably placed in front of the pan 31 between the side extensions 45, to protect the front wall of the pan, to form a support for the lateral flange 33 on the front wall, and to protect an area of the ground in front of the pan, since amateurs using this form of the court are more likely to make short throws which fail to reach the pan. This supplementary apron 47 may be of the same wooden slat construction as before except that, instead of having its top surface level, the top surface is inclined, being of full height at its rear edge (against the pan) and tapering down to a very low height at its front end, so that the forward end of the slats lies practically on the ground. Also, the slats in this portion 47 are preferably somewhat closer together than the spaced slats 41 around the sides and back of the pan.

It is seen from the foregoing disclosure that the above mentioned objects of the invention are admirably fulfilled. It is to be understood that the foregoing disclosure is given by way of illustrative example only, rather than by way of limitation, and that without departing from the invention, the details may be varied within the scope of the appended claims.

What is claimed is:

1. A horseshoe pitching court comprising a pan resting on a supporting surface, a filling of earth-like material in said pan, a stake embedded in said filling and projecting upwardly therefrom, and an apron overlying and protecting the supporting surface for a substantial distance laterally from said pan throughout a substantial part of the perimeter of said pan, said apron having a top surface formed substantially of a series of slats laterally spaced from each other to provide openings for access of air and light to the supporting surface beneath said apron.

2. A portable horseshoe pitching court adapted to be used on a lawn, said court including a frame having a plurality of sections detachably secured to each other and forming a generally U-shaped outline extending around three sides of a space, top members formed of wooden slats secured to said frame and forming a substantially flat top surface thereon, and a pan removably placed in said space and having its sides substantially meeting the inner edges of said top members, said pan being adapted to receive a filling of earth in which a stake may be embedded.

3. A construction as described in claim 2 in which said pan has a side wall of height approximately equal to the combined height of said frame and top members, and has a marginal flange projecting laterally outwardly from the upper edge of said side wall and overlying said top members.

4. A horseshoe pitching court comprising a plurality of apron units each including spaced frame members adapted to rest on the ground and slats extending across and supported by said frame members, said slats being spaced from each other sufficiently to allow substantial access of light and air to the ground between and around said frame members, means detachably securing said plurality of apron units to each other in the general form of the letter U with a substantial space between the units forming the side legs of said U, and a metal pan in said space having a surface area approximately equal to the size of said space and adapted to rest on the ground within said space, said pan having upstanding side walls with outturned upper edges overlapping the edges of said apron units, said pan having a hole through its bottom through which a stake may be driven into the ground beneath and said pan being adapted to receive a filling of earth around said stake.

LEONARD L. BOUCHARD.

REFERENCES CITED

The following references are of record in the file of this patent:

UNITED STATES PATENTS

| Number | Name | Date |
| --- | --- | --- |
| 1,543,767 | Heggen | June 30, 1925 |
| 1,929,922 | Hassenplug | Oct. 10, 1933 |